Nov. 10, 1925

H. J. SMITH

FLEXIBLE COUPLING

Original Filed May 23, 1922

1,561,119

Inventor
HAZOR JUDSON SMITH
By his Attorney

Patented Nov. 10, 1925.

1,561,119

UNITED STATES PATENT OFFICE.

HAZOR JUDSON SMITH, OF SPRINGFIELD, MASSACHUSETTS, ASSIGNOR, BY MESNE ASSIGNMENTS, OF ONE-FOURTH TO WILLARD REID, OF SPRINGFIELD, MASSACHUSETTS; ONE-FOURTH TO ALFRED BUCKLEY, JR., OF PROVIDENCE, RHODE ISLAND; AND ONE-FOURTH TO JOHN W. SCOTT, OF PHILADELPHIA, PENNSYLVANIA.

FLEXIBLE COUPLING.

Application filed May 23, 1922, Serial No. 563,105. Renewed March 31, 1925.

*To all whom it may concern:*

Be it known that HAZOR JUDSON SMITH, a citizen of the United States, residing at Springfield, in the county of Hampton and State of Massachusetts, has invented certain new and useful Improvements in Flexible Couplings, of which the following is a specification, reference being made to the accompanying drawing, forming a part thereof.

This invention relates to flexible couplings of the coil spring type in which the spring is wound in the opposite direction to the application of the torque and has for its object the production of a coupling that will prevent the spring from being unscrewed before shrinkage, due to the torque, takes place. After the establishment of the torque the compression of the coils of the spring prevents the unscrewing of the spring because of increased frictional resistance between the spring and the driving and driven members.

A further object is to produce a spring coupling flexible axially and longitudinally and one permitting considerable misalignment.

Having now set forth my invention I will now describe an embodiment thereof.

Figure 1:
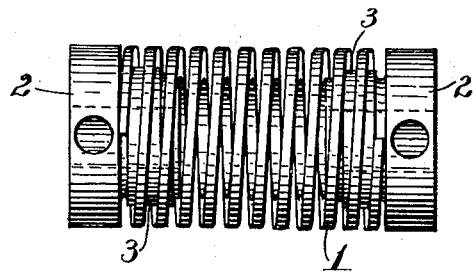
Figure 1 is a side view of my coupling.
Figure 2:
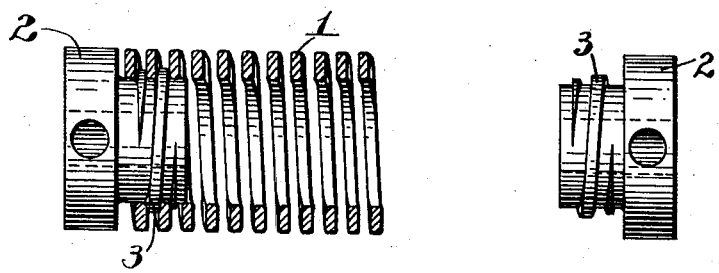
Figure 2 is a view from same position as Figure 1 with the spring shown in cross section and the right hand shank withdrawn.
Figures 3, 4:
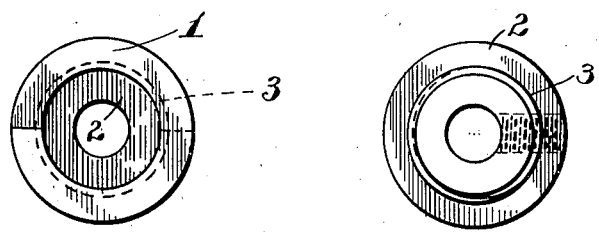
Figure 3 is a view of shank looking from the right, Figure 1.
Figure 4 is a view of shank opposite to that shown in Figure 3.

In the carrying out of my invention I provide a cylindrically wound, helical spring 1 and two shank members 2 provided with thread 3 adapted to snugly fit the coils of the spring 1 so as to screw into position as shown in Figure 1. The spring is wound left hand for a right hand drive and right hand for a left hand drive. While I have shown the cross section of the spring rectangular it may be of any cross section required by the duty to be performed by the coupling. The flat spring shown gives increased flexibility with increased radial strength as will be readily understood. It will be readily understood that the shank members may be provided with any means for securing them on, either set screw or key ways or the like. When the screw shank is screwed into position within the spring it is impossible to unscrew the shank because the spring tends to decrease its inside diameter binding on the shank and holding it firmly in its position as soon as any torque is exerted thereon. It will be readily understood therefore that when a torque in the right hand direction is applied to a left hand wound spring coupling, the shanks will not unscrew and back out as in the case of an ordinary left hand screw and it is upon this important discovery the applicant bases his claims.

It will be observed that when the spring is screwed upon the threaded portion of the shanks it butts against the shoulder, compressing the spring axially which holds the spring tightly to the shank and prevents it from unscrewing when the torque is applied in the opposite direction until the radial compression of the spring takes place, which shrinkage positively holds the spring on the shank.

I am aware that coil springs have been used in flexible couplings before, wherein the coils of the springs have been supported to prevent compressing and that they have been limited to the tensile strength of the spring, but I know of no device which employs the coiled spring wound in the opposite direction to the application of the torque and the compressibility of the coils, increasing the frictional resistance between the spring and the driving and driven members.

Having thus fully described my invention what I claim as new is:—

1. A flexible coupling in combination, a coiled spring wound opposite to the direction of the applied torque, shanks adapted to screw into each end of the spring provided with a collar against which the ends of the spring compress axially whereby tension is given to the spring to prevent its being unscrewed before radial compression takes place due to the application of the torque.

2. A flexible coupling in combination, a coiled spring wound opposite to the direction of the applied torque, shanks adapted to screw into the ends of the spring, means to compress the ends of the spring axially so that the tension on the spring will prevent its being unscrewed before the coils compress radially due to the application of the torque.

3. The device recited in claim 2, the shanks held wholly apart from each other.

In testimony whereof I affix my signature.

HAZOR JUDSON SMITH.